United States Patent

[11] 3,576,483

[72] Inventor Charles C. Gambill
       Kokomo, Ind.
[21] Appl. No. 879,765
[22] Filed Nov. 25, 1969
[45] Patented Apr. 27, 1971
[73] Assignee General Motors Corporation
       Detroit, Mich.

[54] SPEED CONTROL CIRCUIT FOR SPLIT PHASE MOTORS
4 Claims, 1 Drawing Fig.

[52] U.S. Cl. .................................................. 318/221,
       318/225, 318/227, 318/230, 318/345
[51] Int. Cl. .................................................. H02p 5/40,
       H02p 1/44
[50] Field of Search .................................. 318/220,
       221, 225, 227, 230, 345

[56] References Cited
UNITED STATES PATENTS

| | | | |
|---|---|---|---|
| 3,349,307 | 10/1967 | Licata et al. ................... | 318/221 |
| 3,385,077 | 5/1968 | Marsteller ....................... | 318/227X |
| 3,403,315 | 9/1968 | Maynard ........................ | 318/227 |

Primary Examiner—Oris L. Rader
Assistant Examiner—Gene Z. Rubinson
Attorneys—Eugene W. Christen, Creighton R. Meland and Richard G. Stahr ABSTRACT: A speed control circuit for split phase motors of the type having the series combination of a phase winding and an electrical impedance element connected in parallel with the running winding. One diagonal of a resistive bridge circuit having at least one variable resistor is connected across a control circuit resistor, connected in series with the motor across a source of alternating current potential, and the base-emitter electrodes of a transistor are connected across the other diagonal of the bridge circuit. With the bridge circuit unbalanced with a change of resistance value of the variable resistor in a direction to produce emitter-base current flow through the transistor, this device conducts through the emitter-collector electrodes to complete an energizing circuit for the gate-cathode electrodes of a silicon controlled rectifier. The resulting gate-cathode current flow triggers this device conductive through the anode-cathode electrodes thereof which are connected in series with the heater element of a thermal relay across the control resistor to operate the normally open contacts of the relay to the closed condition to complete a low resistance circuit in shunt with the phase winding of the motor.

Patented April 27, 1971 3,576,483
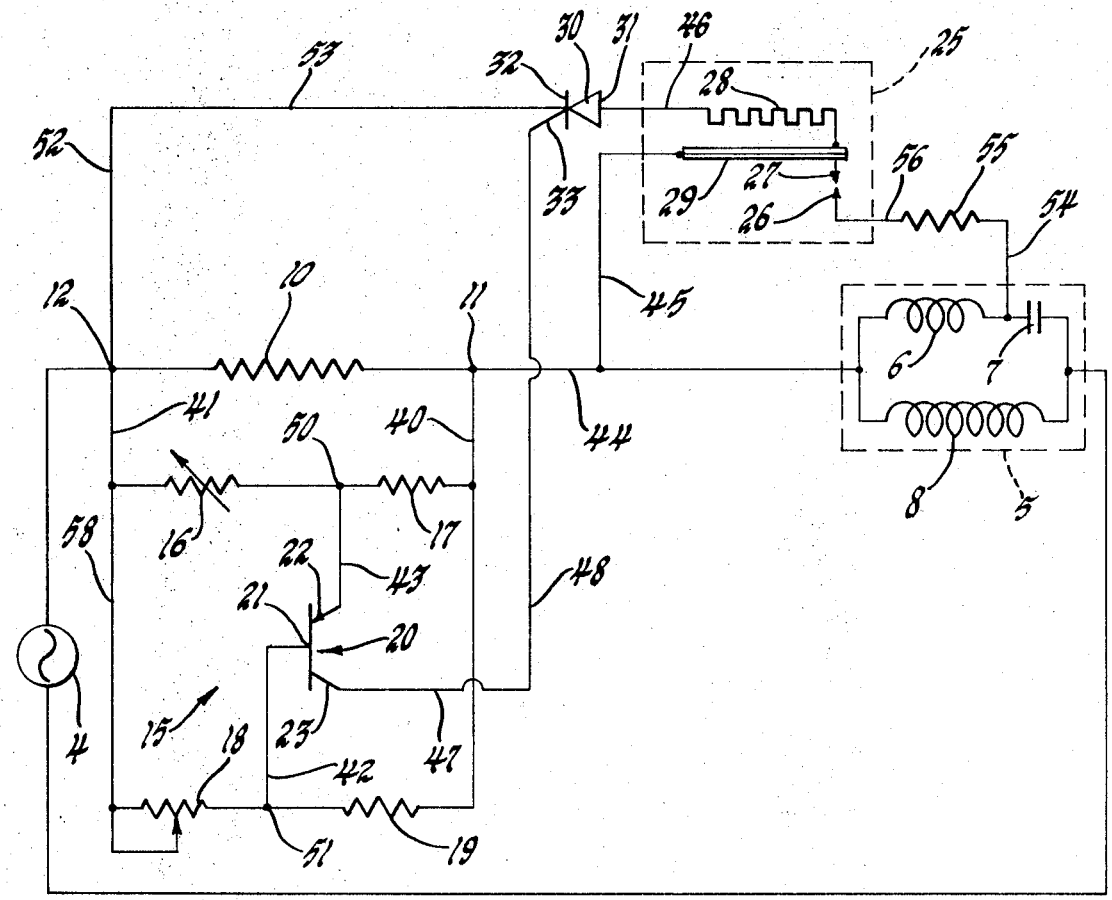
INVENTOR.
Charles C. Gambill
BY
Richard G. Stahl
ATTORNEY

SPEED CONTROL CIRCUIT FOR SPLIT PHASE MOTORS

This invention is directed to motor speed control circuits and, more specifically, to a speed control circuits and, more specifically, to a speed control circuit for use with split phase motors.

With prior art speed control circuits for split phase motors, the control or switching elements are connected in series with the motor across a source of alternating current potential, consequently, the control or switching elements carry full load motor current. Therefore, these elements must have an electric current rating high enough to continuously carry full load motor current. As the cost of electrical elements increases rapidly with increased electric current rating, a speed control circuit for split phase motors wherein the control or switching elements do not carry full load motor current, thereby permitting the use of control or switching elements of a lower current rating, is desirable.

It is, therefore, an object of this invention to provide an improved speed control circuit for split phase motors.

It is another object of this invention to provide an improved speed control circuit for split phase motors wherein the control or switching elements do not carry full load motor current.

In accordance with this invention, a speed control circuit for split phase motors is provided wherein a control potential is applied across one diagonal of a impedance bridge circuit having the base-emitter electrodes of a transistor connected across the other diagonal which is triggered conductive when the bridge circuit becomes unbalanced due to a change in the resistance value of a variable impedance element thereof to complete an energizing circuit for the gate-cathode electrodes of a silicon-controlled rectifier to trigger the silicon controlled rectifier conductive to establish an energizing circuit for the heater element of a thermal relay which operates the normally open contacts of the relay to the closed condition to establish a low resistance circuit in shunt with the phase winding of the motor.

For a better understanding of the present invention, together with additional objects, advantages and features thereof, reference is made to the following description and accompanying single Figure drawing which sets forth the novel speed control circuit of this invention in schematic form.

Although the operation of the novel speed control circuit of this invention will be described in this specification as used with a permanent split capacitor type motor, it is to be specifically understood that this speed control circuit is equally satisfactory for use with any split phase motor having an electrical impedance element connected in series with the phase winding.

Referring to the FIGURE, the novel speed control circuit for split phase motors of this invention is set forth in schematic form in combination with a source of alternating current potential 4 and a split phase motor 5 of the type having the series combination of a phase winding 6 and an electrical impedance element, capacitor 7, connected in parallel with the running winding 8.

Source of alternating current potential 4 may be any one of several known in the art and, per se, forms no part of this invention, consequently, it has been represented in the FIGURE by the accepted schematic symbol.

Briefly, the novel speed control circuit for split phase motors of this invention includes a method for producing a control potential, may be a control circuit impedance element such as control circuit resistor 10 or any other suitable impedance element connected in series with motor 5 and source of alternating current potential 4; an impedance bridge circuit 15 including at least one variable impedance element 16; a normally open electrical switching device having two current-carrying elements of the type which is electrically operable to an electric circuit closing condition through the current-carrying elements thereof in response to an applied potential, may be type PNP transistor 20 having a control electrode and two current carrying electrodes; a normally open thermal relay 25 having a stationary contact 26, a movable contact 27 operable under the influence of heat to electrically close to the stationary contact 26 and a heater element 28; and a silicon controlled rectifier 30 having an anode electrode 31, a cathode electrode 32, and a gate electrode 33.

The control potential produced across control circuit impedance element 10 by the flow of motor current therethrough is applied across one diagonal of bridge circuit 15 through leads 40 and 41 which connect one diagonal of bridge circuit 15 across respective terminal ends 11 and 12 of control circuit impedance element 10.

The potential appearing across the other diagonal of bridge circuit 15 is applied to the electrical switching device 20 through leads 42 and 43 which connect the control electrode, base electrode 21, and a selected one of the current-carrying electrodes, emitter electrode 22, of transistor 20 across the other diagonal of bridge circuit 15.

The control potential produced across control circuit impedance element 10 is also applied across the heater element 28 of thermal relay 25 and the anode-cathode electrodes of silicon controlled rectifier 30 in series through a circuit which may be traced from terminal end 11 of control circuit impedance element 10 though leads 44 and 45, electrically conductive armature 29 of thermal relay 25, heater element 28, lead 46, the anode-cathode electrodes of silicon-controlled rectifier 30, and leads 53 and 52 to the other terminal end 12 of control circuit impedance element 10.

The control potential produced across control circuit impedance element 10 is also applied across the gate-cathode electrodes of silicon controlled rectifier 30 and the current-carrying elements, emitter electrode 22 and collector electrode 23, of transistor 20 in series through a circuit which may be traced from terminal end 11 of control circuit impedance element 10 through lead 40, resistor 17, lead 43, the emitter-collector electrodes of transistor 20, leads 47 and 48, the gate-cathode electrodes of silicon controlled rectifier 30 and leads 53 and 52 to terminal end 12 of control circuit impedance element 10.

The normally open contacts 26 and 27 of thermal relay 25 are connected in shunt across phase winding 6 of motor 7 through lead 54, resistor 55 and lead 56 and through lead 45 and electrically conductive armature 29 of thermal relay 25.

In the FIGURE, impedance bridge circuit 15 is shown to be a resistor bridge circuit comprising variable resistor 16, resistor 17, variable resistor 18 and resistor 19 connected in a bridge type configuration and control circuit impedance element 10 is shown to be a resistor. It is to be specifically understood, however, that other suitable impedance elements may be substituted for these resistors without departing from the spirit of the invention.

Variable resistor 16 may be of the type which changes in resistance value in response to any external influence such as temperature, pressure, potential, current, light or any other external influence. Consequently, this element has been illustrated in FIGURE by the accepted symbol which indicates an impedance element which is variable in response to any external influence. To properly balance the bridge circuit, either one or both of resistors 18 and/or 19 may also be made variable.

With contacts 26 and 27 of thermal relay 25 open, substantially full line potential, less the potential drop across control circuit resistor 10, is applied across motor 5, consequently, motor 5 operates at the high speed as determined by the number of poles produced by the stator windings. With contacts 26 and 27 of thermal relay 25 closed, resistor 55 is connected in shunt across phase winding 6 of motor 5, consequently, a portion of the phase-winding current is shunted through resistor 55 to reduced the magnitude of current flow through phase winding 6. This reduction of current flow through phase winding 6 reduces the torque of motor 5, consequently, motor 5 operates at the low speed as determined by the amount of the reduction of current flow through phase winding 6 which, of course, is determined by the resistance value of resistor 55.

A thermal relay 25 is responsive to heat, heater element 28 is electrically energized to operate contacts 26 and 27 thereof to the closed condition. Heater element 28 of thermal relay 25 and the anode-cathode electrodes of silicon-controlled rectifier 30 are connected in series across control circuit resistor 10 through a circuit previously described, consequently, conducting silicon-controlled rectifier 30 completes an energizing circuit for heater element 28. Therefore, to operate motor 5 at the low speed, silicon-controlled rectifier 30 is triggered conductive through the anode-cathode electrodes thereof to establish an energizing circuit for heater element 28 of thermal relay 25 to operate movable contact 27 into electrical contact with stationary contact 26.

For purposes of this specification, it will be assumed that motor 5 is employed to drive a fan, not shown, in a space heater, that when the space to be heated is of a selected temperature motor 5 will drive the fan at the low speed and will automatically transfer to the high speed when the temperature of the space to be heated falls below the selected temperature and that variable resistor 16 is located in the space to be heated. As motor 5 must drive the fan at the low speed while the temperature of the space to be heated is at or above the selected temperature, it is necessary that the bridge circuit 15 become unbalanced in a direction to produce emitter-base current flow through transistor 20 with a temperature increase to trigger this device conductive through the emitter-collector electrodes thereof to complete a gate-cathode energizing circuit for silicon controlled rectifier 30.

Silicon-controlled rectifier 30 will conduct through the anode-cathode electrodes thereof only during the half cycles of alternating current supply potential during which the potential upon terminal end 11 of control circuit resistor 10 is of a positive polarity with respect to terminal end 12 as only during these half cycles is the anode-cathode electrodes of silicon controlled rectifier 20 forward poled. As transistor 20 is of the PNP type, the potential upon junction 50 of bridge circuit 15 must be of a positive polarity with respect to junction 51 to produce emitter-base current flow therethrough. Therefore, to trigger silicon-controlled rectifier 30 conductive through the anode-cathode electrodes thereof during the half cycles of alternating current supply potential during which the potential upon terminal end 11 of control circuit resistor 10 is of a positive polarity with respect to terminal end 12, bridge circuit 15 must become unbalanced, during these half cycles, in a direction to produce emitter-base current flow through type PNP transistor 20 with temperature increase. Variable resistor 16, consequently, must be of the type which increases in resistance value with increases of the surrounding temperature to produce a greater potential drop thereacross with increases of surrounding temperature, a condition which will result in a potential across junctions 50 and 51 which is of a positive polarity upon junction 50 with respect to junction 51 during half cycles of alternating current supply potential during which the potential upon terminal end 11 of control current resistor 10 is of a positive polarity with respect to terminal end 12.

As motor 5 must drive the fan at the high speed while the temperature of the space to be heated is below the selected temperature, bridge circuit 15 must be balanced at or near the selected temperature by adjusting variable resistor 18 and/or 19, a condition which will result in a zero potential across junctions 50 and 51.

With an increase of temperature surrounding variable resistor 16, the resistance value thereof and, consequently, the potential drop thereacross increases to produce a potential across junctions 50 and 51 which is of a positive polarity upon junction 50 with respect to junction 51 during the half cycles of alternating current supply potential during which the potential upon terminal end 11 of control circuit resistor 10 is of a positive polarity with respect to terminal end 12. As this potential is applied across the emitter-base electrodes of transistor 20 through leads 42 and 43 in the proper potential polarity relationship to produce emitter-base current flow through a type PNP transistor, transistor 20 conducts through the emitter-base electrodes thereof through a circuit which may be traced from terminal end 11 of control circuit resistor 10, through lead 40, resistor 17, lead 43, the emitter-base junction of transistor 20, lead 42, variable resistor 18 and leads 58 and 41 to terminal end 12 of control circuit resistor 10. This emitter-base current flow through transistor 20 produces emitter-collector current flow therethrough to complete an energizing circuit across control circuit resistor 10 for the gate-cathode electrodes of silicon controlled rectifier 30 through a circuit which may be traced from terminal end 11 of control circuit resistor 10, through lead 40, resistor 17, lead 43, the emitter-collector electrodes of transistor 20, leads 47 and 48, the gate-cathode electrodes of silicon controlled rectifier 30 and leads 53 and 52 to terminal end 12 of control circuit resistor 10.

This flow of gate current through silicon-controlled rectifier 30 triggers this device conductive through the anode-cathode electrodes thereof to complete an energizing circuit for the flow current through heater element 28 of terminal relay 25 through a circuit which may be traced from terminal end 11 of control circuit resistor 10, through lead 45, the electrically conductive armature 29 of thermal relay 25, heater element 28, the anode-cathode electrodes of silicon controlled rectifier 30 and leads 53 and 52 to terminal end 12 of control circuit resistor 10.

This flow of current through heater element 28 of thermal relay 25 produces heat which operates movable contact 27 of thermal relay 25 into electrical contact with stationary contact 26. With movable contact 27 closed to stationary contact 26, resistor 55 is connected in shunt across phase winding 6 of motor 5.

With resistor 55 connected in shunt across phase winding 6 of motor 5, the current flow through phase winding 6 is reduced in magnitude. This reduction of phase current through phase winding 6 reduces the speed of motor 5, consequently, motor 5 operates at the low speed as determined by the resistance value of resistor 55.

When the temperature of the space to be heated has reduced to the selected temperature, the resistance value of variable resistance 16 decreases until bridge circuit 15 is balanced. With bridge circuit 15 balanced, the potential appearing across the emitter-base electrodes of transistor 20 is zero, consequently, transistor 20 extinguishes to interrupt the gate-cathode circuit for silicon controlled rectifier 30. With the next half cycle of the alternating current supply potential during which the potential upon terminal end 11 of control circuit resistor 10 is of a negative polarity with respect to terminal end 12, silicon-controlled rectifier 30 extinguishes as the potential applied across the anode-cathode electrodes thereof during these half cycles of the alternating current supply potential is of an inverse polarity relationship. As the gate-cathode circuit for silicon controlled rectifier 30 is interrupted by nonconducting transistor 20, this device does not become conductive until the space temperature falls below the selected temperature to unbalance bridge circuit 15.

As silicon controlled rectifier 30 interrupts the energizing circuit for heater element 28 of thermal relay 25, movable contact 27 moves out of electrical contact with stationary contact 26 to disconnect resistor 55 from across phase winding 6 of motor 5. Consequently, motor 5 operates at the high speed.

Should the space temperature fall below the selected temperature, the resistance value of variable resistance 16 would continue to decrease. This condition would, of course, unbalance bridge circuit 15. However, with the resistance value of variable resistor reduced, the potential appearing across junctions 50 and 51 would be of a negative polarity upon junction 50 with respect to junction 51 during the half cycles of the alternating current supply potential during which the potential upon terminal end 11 of bridge circuit resistor 10 is of a positive polarity with respect to terminal end 12. As this is not the proper potential polarity relationship to produce emitter-base current flow through a type NPN transistor, transistor 20 does not conduct, therefore, silicon controlled rectifier 30 is not triggered conductive. Consequently, motor 5 continues to run at the high speed.

Those prior art split phase motor speed control circuits which use solid state electrical switching elements to switch full load motor current tend to produce objectionable electrical noise and/or motor mechanical noise with each switching operation. As the electrical switching device in the novel speed control circuit of this invention switches only the small phase current, the objectionable electrical and/or mechanical noises produced by prior art control circuits with each switching operation are eliminated.

The novel speed control circuit of this invention provides the following desirable advantages over prior art speed control circuits: (1) Low costs; (2) High starting and stalling torque; (3) Little, if any, objectionable electrical and/or mechanical noise.

While specific electrical devices and polarities have been set forth in this specification, it is to be specifically understood that alternate electrical devices having similar electrical characteristics and compatible electrical polarities may be substituted therefor without departing from the spirit of the invention.

I claim:

1. A speed control circuit for split phase motors comprising in combination with a source of alternating current potential and a split phase motor of the type having the series combination of a phase winding and an electrical impedance element connected in parallel with the running winding,
    means for producing a control potential,
    an impedance bridge circuit including at least one variable impedance element,
    means for applying said control potential across one diagonal of said bridge circuit,
    a normally open electrical switching device having two current-carrying elements of the type which is electrically operable to an electric circuit closing condition through the current carrying elements thereof in response to an applied potential,
    means for applying the potential appearing across the other diagonal of said bridge circuit to said electrical switching device,
    a normally open thermal relay having a stationary contact, a movable contact operable under the influence of heat to electrically close to said stationary contact and a heater element,
    a silicon-controlled rectifier having anode, cathode, and gate-electrodes,
    means for applying said control potential across said heater element of said thermal relay and said anode-cathode electrodes of said silicon-controlled rectifier in series,
    means for applying said control potential across said gate-cathode electrodes of said silicon-controlled rectifier and said current-carrying elements of said electrical switching device in series, and
    means for connecting said normally open contacts of said thermal relay in shunt across said phase winding of said motor.

2. A speed control circuit for split phase motors comprising in combination with a source of alternating current potential and a split phase motor of the type having the series combination of a phase winding and an electrical impedance element connected in parallel with the running winding,
    means for producing a control potential,
    an impedance bridge circuit including at least one variable impedance element,
    means for applying said control potential across one diagonal of said bridge circuit,
    a transistor having a control electrode and two current-carrying electrodes,
    means for connecting said control electrode and a selected one of said current-carrying electrodes of said transistor across the other diagonal of said bridge circuit,
    a normally open thermal relay having a stationary contact, a movable contact operable under the influence of heat to electrically close to said stationary contact and a heater element,
    a silicon-controlled rectifier having anode, cathode, and gate electrodes,
    means for applying said control potential across said heater element of said thermal relay and said anode-cathode electrodes of said silicon-controlled rectifier in series,
    means for applying said control potential across said gate-cathode electrodes of said silicon-controlled rectifier and said current-carrying electrodes of said transistor in series, and
    means for connecting said normally open contacts of said thermal relay in shunt across said phase winding of said motor.

3. A speed control circuit for split phase motors comprising in combination with a source of alternating current potential and a split phase motor of the type having the series combination of a phase winding and an electrical impedance element connected in parallel with the running winding,
    a control circuit impedance element connected in series with said motor and said source of alternating current potential,
    an impedance bridge circuit including at least one variable impedance element,
    means for connecting one diagonal of said bridge circuit across said control circuit impedance element,
    a transistor having a control and two current-carrying electrodes,
    means for connecting said control electrode and a selected one of said current-carrying electrodes of said transistor across the other diagonal of said bridge circuit,
    a normally open thermal relay having a stationary contact, a movable contact operable under the influence of heat to electrically close to said stationary contact and a heater element,
    a silicon-controlled rectifier having anode, cathode, and gate electrodes,
    means for connecting said heater element of said thermal relay and said anode-cathode electrodes of said silicon-controlled rectifier in series across said control circuit impedance element,
    means for connecting said gate-cathode electrodes of said silicon-controlled rectifier and said current carrying electrodes of said transistor in series across said control circuit impedance element, and
    means for connecting said normally open contacts of said thermal relay in shunt across said phase winding of said motor.

4. A speed control circuit for split phase motors comprising in combination with a source of alternating current potential and a split phase motor having the series combination of a phase winding and an electrical impedance element connected in parallel with the running winding,
    a control circuit resistor connected in series with said motor and said source of alternating current potential,
    a resistance bridge circuit including at least one variable resistor,
    means for connecting one diagonal of said bridge circuit across said control circuit resistor,
    a transistor having base, collector and emitter electrodes,
    means for connecting said base-emitter electrodes of said transistor across the other diagonal of said bridge circuit,
    a normally open thermal relay having a stationary contact, a movable contact operable under the influence of heat to electrically close to said stationary contact and a heater element,
    a silicon controlled rectifier having anode, cathode, and gate electrodes, means for connecting said heater element of said thermal relay and said anode-cathode electrodes of said silicon-controlled rectifier in series across said control circuit resistor, means for connecting said gate-cathode electrodes of said silicon-controlled rectifier and said collector-emitter electrodes of said transistor in series across said control circuit resistor, and means for connecting said normally open contacts of said thermal relay in shunt across said phase winding of said motor.